(12) United States Patent
Hogate

(10) Patent No.: US 8,049,147 B2
(45) Date of Patent: Nov. 1, 2011

(54) ENGINE INLET ICE PROTECTION SYSTEM WITH POWER CONTROL BY ZONE

(75) Inventor: Isaac Jon Hogate, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 783 days.

(21) Appl. No.: 12/079,762

(22) Filed: Mar. 28, 2008

(65) Prior Publication Data

US 2009/0242549 A1 Oct. 1, 2009

(51) Int. Cl.
*H05B 3/44* (2006.01)
*F01D 25/08* (2006.01)

(52) U.S. Cl. ........ 219/544; 219/205; 219/545; 219/635; 415/177; 415/178; 416/95; 244/134 R; 244/134 B; 60/39.093

(58) Field of Classification Search .............. 219/544, 219/635, 205, 545; 415/177–8; 416/95; 60/39.093; 244/134 R, 134 B
See application file for complete search history.

(56) References Cited

U.S. PATENT DOCUMENTS

| | | | |
|---|---|---|---|
| 1,807,359 A | 5/1931 | Waters | |
| 2,680,345 A | 6/1954 | Frost | |
| 2,699,303 A | 1/1955 | Chilman | |
| 2,744,680 A | 5/1956 | Rainbow et al. | |
| 3,183,975 A | 5/1965 | Keen | |
| 3,420,476 A | 1/1969 | Volkner et al. | |
| 4,021,008 A | 5/1977 | Eichenauer | |
| 4,036,457 A | 7/1977 | Volkner et al. | |
| RE32,100 E | 4/1986 | Rannenberg | |
| 4,738,416 A | 4/1988 | Birbragher | |
| 5,074,497 A | 12/1991 | Phillips, II | |
| 5,281,091 A | 1/1994 | Dooley et al. | |
| 5,314,145 A | 5/1994 | Rauckhorst, III | |
| 5,351,918 A | 10/1994 | Giamati | |
| 5,489,073 A | 2/1996 | Leffel et al. | |
| 5,657,951 A | 8/1997 | Giamati | |
| 5,657,952 A | 8/1997 | Goldberg | |
| 5,947,418 A | 9/1999 | Bessiere et al. | |
| 6,129,314 A | 10/2000 | Giamati et al. | |
| 6,279,856 B1 | 8/2001 | Rutherford et al. | |
| 6,330,986 B1 | 12/2001 | Rutherford et al. | |
| 6,588,385 B2 | 7/2003 | Fuwa | |
| 7,124,983 B2 | 10/2006 | Chow et al. | |
| 7,230,205 B2 | 6/2007 | Twerdochlib | |
| 7,246,773 B2 | 7/2007 | Stoner et al. | |
| 7,291,815 B2 | 11/2007 | Hubert et al. | |
| 7,789,620 B2 * | 9/2010 | Vontell et al. ............... | 415/178 |
| 2006/0280600 A1 | 12/2006 | Euvino, Jr. et al. | |
| 2007/0187381 A1 | 8/2007 | Vontell, Sr. et al. | |

FOREIGN PATENT DOCUMENTS

| | | |
|---|---|---|
| WO | WO 2005/073539 A1 | 8/2005 |
| WO | WO 2007/107732 A1 | 9/2007 |

* cited by examiner

*Primary Examiner* — Shawntina Fuqua
(74) *Attorney, Agent, or Firm* — Kinney & Lange, P.A.

(57) ABSTRACT

A system includes a first heater located at the leading edge of a gas turbine structural member, a second heater located aft of the first heater, and a third heater located aft of the second heater. The first, second and third heaters are electrically-powered to prevent icing of the gas turbine structural member. Each of the heaters has a Watt density, and the Watt densities of the heaters differ from one another as a function of a magnitude of a cooling coefficient for airflow passing the vicinity of each heater.

4 Claims, 4 Drawing Sheets

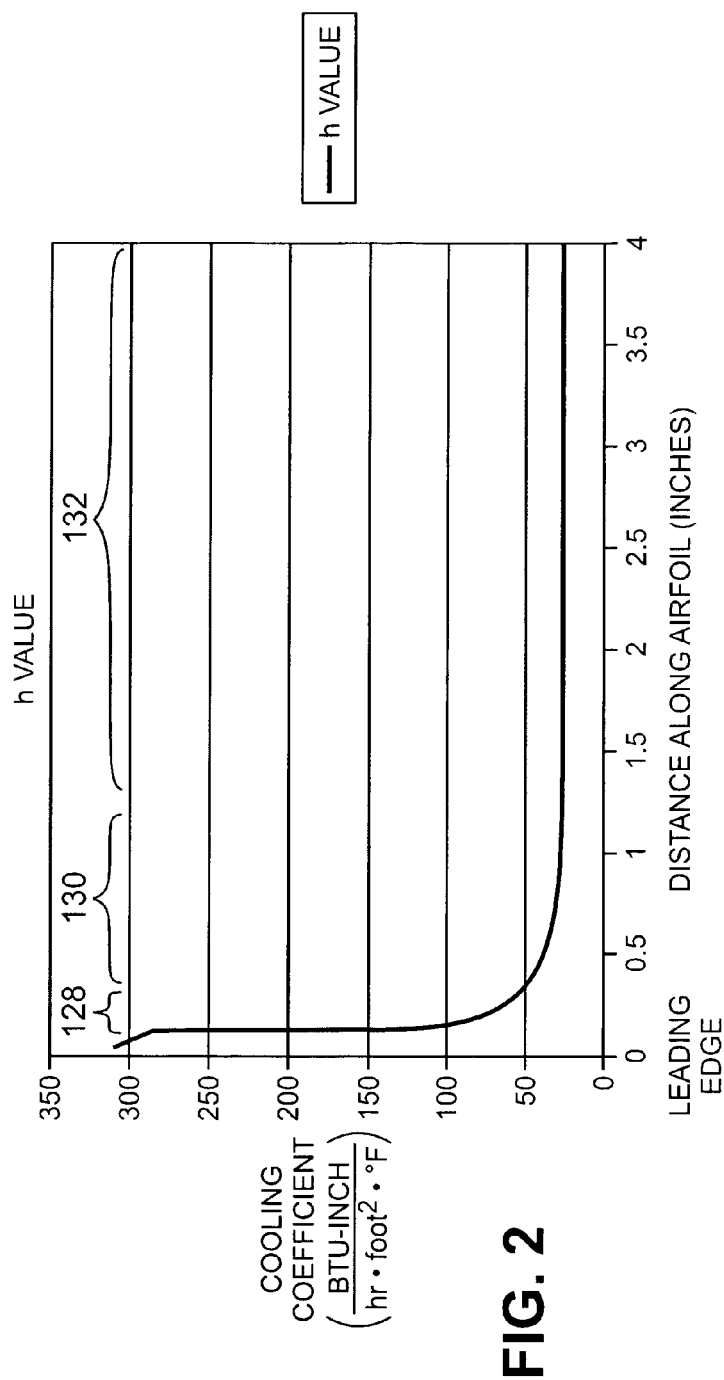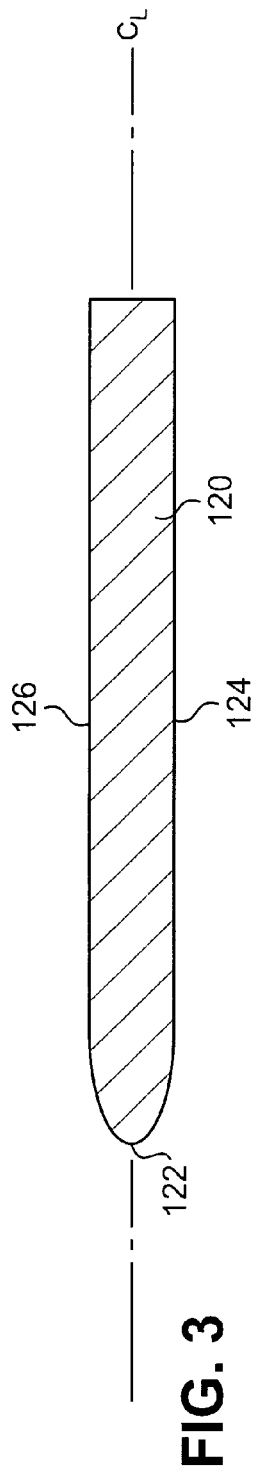

ENGINE INLET ICE PROTECTION SYSTEM WITH POWER CONTROL BY ZONE

STATEMENT OF GOVERNMENT INTEREST

The present invention was developed pursuant to Contract No. N00019-02-C-3003 awarded by United States Air Force. The U.S. Government has certain rights in this invention.

BACKGROUND

During operation, gas turbine engines, especially those used in aerospace applications, face an undesirable risk of ice accretion on engine components. Ice that forms on engine inlet components can break loose and be ingested by the engine, potentially causing damage or wear to the engine. In order to avoid such problems, it is desired to provide an ice protection system that reduces ice formation on engine structural components while also maintaining relatively low power expenditures by the ice protection system.

SUMMARY

A system includes a first heater located at the leading edge of a gas turbine structural member, a second heater located aft of the first heater, and a third heater located aft of the second heater. The first, second and third heaters are electrically-powered to prevent icing of the gas turbine structural member. Each of the heaters has a Watt density, and the Watt densities of the heaters differ from one another as a function of a magnitude of a cooling coefficient for airflow passing the vicinity of each heater.

BRIEF DESCRIPTION OF THE DRAWINGS

FIG. 2 is a graph of cooling coefficient versus distance along an airfoil surface for one embodiment of an inlet strut according to the present invention.

FIG. 3 is a cross-section of the inlet strut utilized as the basis for the graph shown in FIG. 2.

DETAILED DESCRIPTION

The present invention provides an ice protection system for a structural member of a gas turbine engine, such as an inlet strut or vane. More particularly, the present invention provides electrically-powered heaters having different Watt density embedded within the structural member at different locations along the structural member as a function of cooling coefficients for airflow passing the structural member during engine operation. Furthermore, the locations of different heaters according to the present invention can also be arranged as a function of cooling coefficients for airflow passing the structural member during engine operation. One or more heaters can be powered substantially continually during engine operation, or at least during flight conditions, while other heaters located generally downstream can be selectively powered according to a duty cycle.

Figure 1:
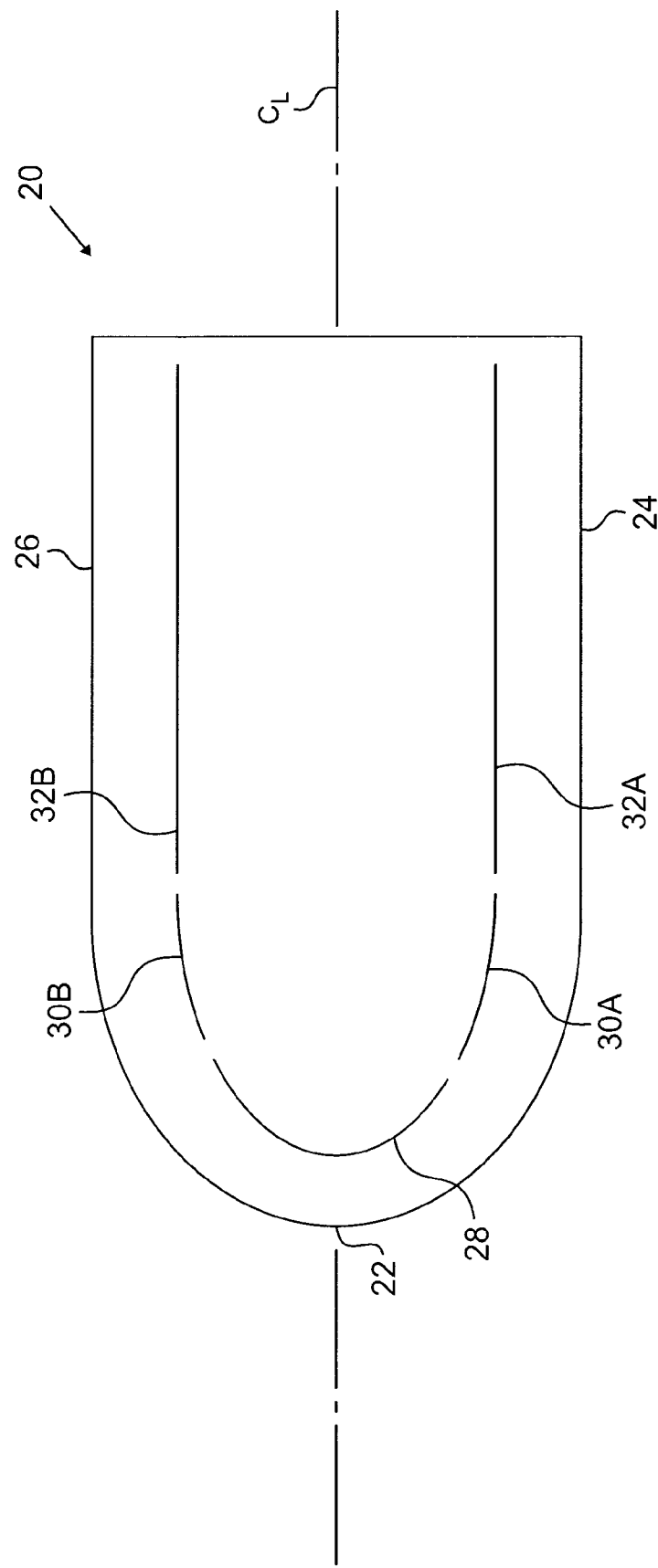
FIG. 1 is a schematic cross-sectional view of a gas turbine engine inlet strut having an ice protection system according to the present invention.

FIG. 1 is a schematic cross-sectional view of a gas turbine engine inlet strut 20 having an ice protection system. The strut 20 defines a leading edge 22 and a pair of opposed sidewalls 24 and 26. In the illustrated embodiment, the strut 20 has a two-dimensional profile that is symmetrical about a centerline $C_L$. It should be noted that the shape of the strut 20 as shown in FIG. 1 is merely exemplary, and strut configuration can vary as desired for particular applications. The strut 20 can be formed from a moldable composite material.

The ice protection system includes a first electrothermal heater 28, a pair of second electrothermal heaters 30A and 30B, and a pair of third electrothermal heaters 32A and 32B. All of the electrothermal heaters 28, 30A, 30B, 32A and 32B are embedded within the strut 20. The first electrothermal heater 28 is positioned at the leading edge 28 of the strut 20. The pair of second electrothermal heaters 30A and 30B are arranged opposite one another along the sidewalls 24 and 26, respectively, and downstream (aft or rearward) from the first electrothermal heater 28. The pair of third electrothermal heaters 32A and 32B are arranged opposite one another along the sidewalls 24 and 26, respectively, and downstream (aft or rearward) from the pair of second electrothermal heaters 30A and 30B.

Each electrothermal heater 28, 30A, 30B, 32A and 32B can be of a conventional type, for instance, each can be formed as from a spray metal resistive layer disposed on fiberglass webs. Suitable electrothermal heater mats can be obtained from GKN plc., Redditch, United Kingdom. Such electrothermal heater mats are then embedded in the strut 20 during molding of the strut 20 in an overmolding process whereby the electrothermal heater mats are epoxied directly within the strut 20. A gap, sized as small as possible, is present between adjacent electrothermal heaters 28, 30A, 30B, 32A and 32B, in order to electrically insulate the electrothermal heaters 28, 30A, 30B, 32A and 32B. The number of electrothermal heaters and their locations can vary as a function of the leading edge 22 radius and thickness of the strut 20, as well as the cooling coefficient along the strut 20, as explained further below. Greater or fewer electrothermal heaters can be utilized in further embodiments. The distance from an exterior surface of the strut 20 at which the electrothermal heaters 28, 30A, 30B, 32A and 32B are embedded can vary based upon the thermal conductivity of the particular material selected to form the strut 20.

The Watt densities of the electrothermal heaters 28, 30A, 30B, 32A and 32B are different in different locations along the strut 20. A first Watt density of the first electrothermal heater 28 is greater than a second Watt density of each of the pair of second electrothermal heaters 30A and 30B, which in turn is greater than a third Watt density of each of the pair of third electrothermal heaters 32A and 32B. In one embodiment, the first Watt density is about three times as great as the second Watt density, and the second Watt density is about two times as great as the third Watt density. The particular relationships of the first, second and third Watt densities can vary for different applications based upon the relevant cooling coefficient distribution.

The risk of ice accretion on the strut 20 generally varies along the chord length of the strut 20 as a function of the cooling coefficient along the external surfaces of the strut 20. The ice collection efficiency on the strut 20 also present a greater risk of ice accretion the greater the radius of curvature, meaning that the greatest risk of ice collection risk is at the leading edge 22. Accordingly, the first Watt density for the first electrothermal heater 28 is greatest because the cooling coefficient and the risk of ice accretion are greatest at the leading edge 22 of the strut 20. However, in order to reduce the overall power expenditure of the ice protection system of the present invention, the Watt densities of the downstream electrothermal heaters 30A, 30B, 32A and 32B are lower than the first Watt density of the first electrothermal heater 28.

FIG. 2 is a graph of cooling coefficient h (or h value), measured in ((btu×inch)/(hr×ft²×° F.)) versus distance, measured in inches, along an exterior airfoil surface for one embodiment of an inlet strut 120 arranged in a conventional infinite cascade configuration. FIG. 3 is a cross-section of the inlet strut 120 utilized as the basis for the graph shown in FIG. 2, showing the symmetrical profile of the strut 120 (the electrothermal heaters are not shown in FIG. 3 for simplicity). Because the profile of the strut 120 is symmetrical, the graph of FIG. 2 applies equally to the distance along either sidewall 146 or 126. As shown in FIG. 2, the cooling coefficient h is greatest near a leading edge 122 of the strut 120, and decreases in the aft or downstream direction along the sidewalls 124 and 126 of the strut 120. Because the strut 120 is arranged in an infinite cascade and has a symmetrical profile, an airflow stagnation point is located within about 1-2° of the centerline $C_L$ of the strut 120 during engine operation.

A first electrothermal heater extends through a first region 128 along the strut 120, second electrothermal heaters extend through a second region 130 along the strut 120, and third electrothermal heaters extend through a third region 132 along the strut 120. In the illustrated embodiment, the first region 128 corresponds to a portion of the curve representing the cooling coefficient h that has a relatively steep average slope and the greatest magnitudes. The second region 130 corresponds to a portion of the curve representing the cooling coefficient h that has a significantly lesser average slope than in the first region 128 and lower magnitudes. The third region 132 corresponds to a portion of the curve representing the cooling coefficient h that has a nearly flat or zero slope and the least magnitudes.

In order to further reduce power consumption by the ice protection system, the various electrothermal heaters can be selectively powered independent of each other. For instance, in the first region 128 power can be provided to generate heat substantially continuously during engine operation, or at least during flight conditions, while in downstream regions (e.g, the second and third regions 130 and 132) power can be cycled on and off according to a fixed duty cycle. In one embodiment, power is selectively provided to each of the second and third regions 130 and 132 every one minute. In this way, the first region 128 can provide anti-icing to reduce ice formation in an area most prone to ice accretion. while the downstream second and third regions 130 and 132 can provide de-icing to periodically melt any ice that has frozen in any of those regions or re-frozen in of those regions after being previously melted further upstream. The use of de-icing modes of operation can help reduce overall power consumption, while still providing suitable ice protection.

Figure 4:
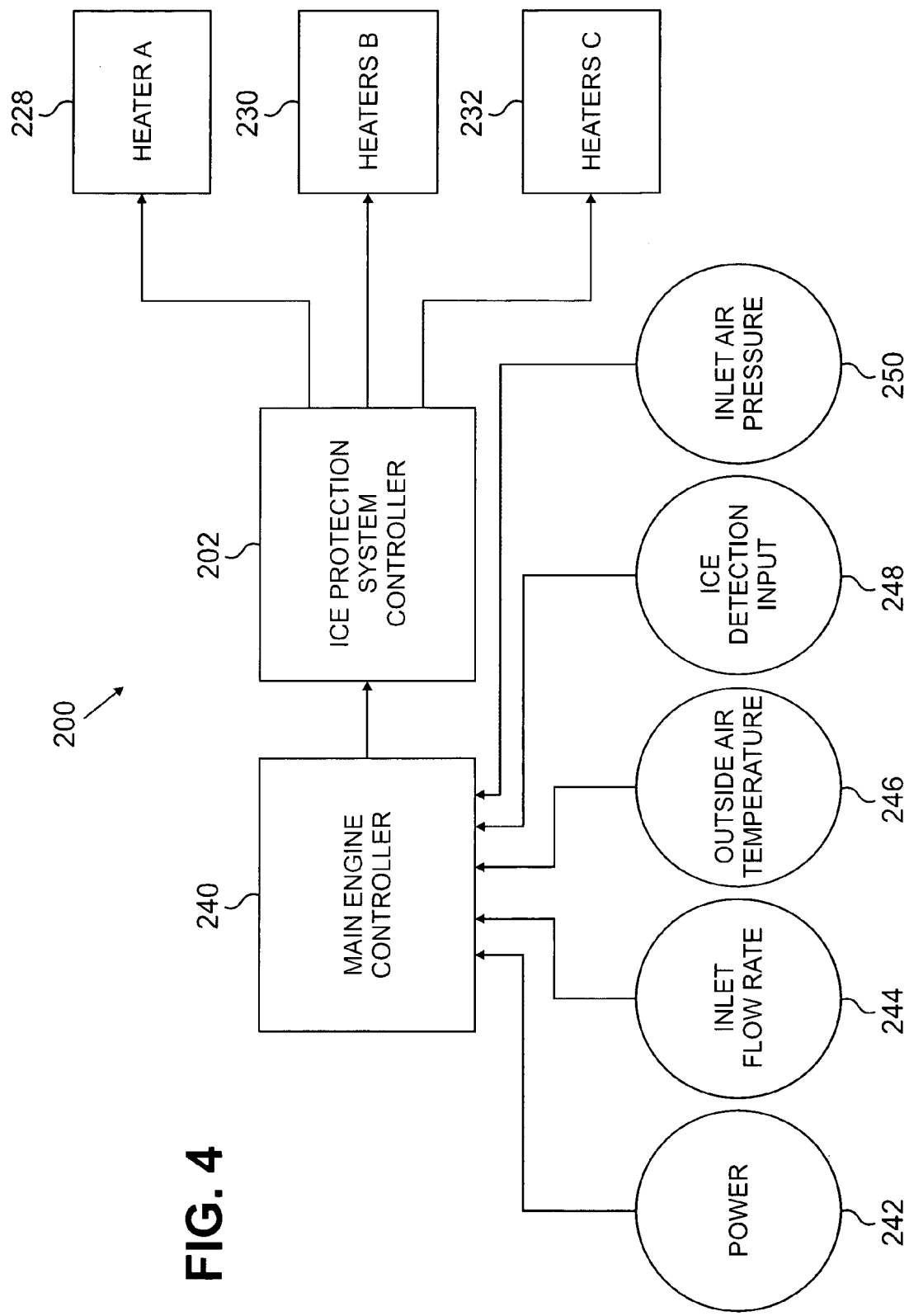
FIG. 4 is a block diagram of the ice protection system.

FIG. 4 is a block diagram of the ice protection system 200, which includes an ice protection system controller 202 and heaters 228, 230 and 232. The ice protection system controller 202 is operably connected to a main engine controller 240, such as a conventional full-authority digital electronics controller (FADEC), that receives and distributes a power input 242 as well as inputs for parameters such as an inlet flow rate 244, an outside air temperature 246, an ice detection input 248, and an inlet air pressure 250 from suitable sensors. Some or all of the inputs 244, 246, 248 and 250 can be utilized to coordinate a duty cycle for the heaters 228, 230 and 232.

Figure 5:
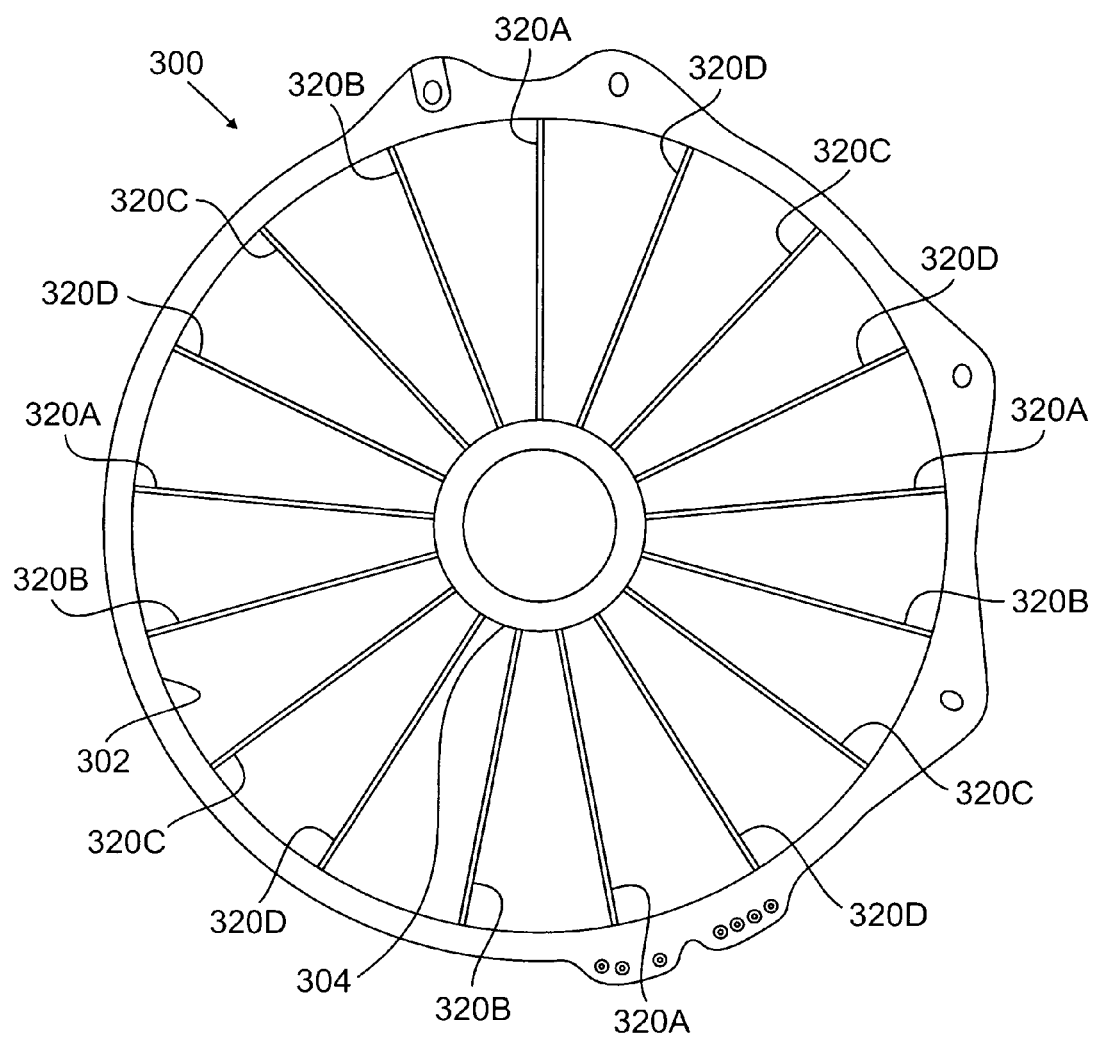
FIG. 5 is a front view of an inlet assembly utilizing the ice protection system.

FIG. 5 is a front view of an inlet assembly 300 utilizing an ice protection system of the present invention. The inlet assembly 300 defines a substantially annular flowpath between an outer diameter flowpath boundary 302 and an inner diameter flowpath boundary 304. A nosecone (not shown) can be installed at the inner diameter flowpath boundary 304 aligned with the engine centerline. A plurality of struts 320A-320D (collectively, struts 320) extend between the outer and inner diameter flowpath boundaries 302 and 304 in a cascade configuration. In the illustrated embodiment, there are seventeen struts 320, though the number of struts 320 can vary in alternative embodiments. The struts 320 are divided into four heating zones. In the illustrated embodiment, the struts 320A of a first zone are interspersed with the struts 320B-320D of second, third and fourth zones, and vice-versa, such that the struts 320 of any given zone are relatively evenly circumferentially (or azimuthally) spaced rather than being in contiguous angular quadrants. The struts 320A of the first zone are controlled together, the struts 320B are controlled together, the struts of the third zone 320C are controlled together, and the struts 320D are controlled together. In this way, the struts 320 within each zone can be powered simultaneously, while struts 320 in other zones can be powered differently in a cyclic manner. For instance, the struts 320A-320D for each zone can have electrothermal heaters powered one at a time for a given period (e.g., 30 seconds on) then powered off for a period as power is cycled to the electrothermal heaters of the struts 320A-320D in other zones. This power cycling helps reduce overall power consumption. Optionally, an electrothermal heater in a nosecone (not shown) can be included in the duty cycle, such that the nosecone defines at least one other zone to which power is cycled on and off along with the zones for the struts 320A-320D. This power cycle can be repeated as necessary given engine operating conditions.

It should be recognized that the present invention provides a number of advantages. For instance, the present invention provides electrically-powered ice protection to a gas turbine engine structural member with a relatively low overall power expenditure. Moreover, by embedding the electrothermal heaters within the structural member, the heaters obtain protection from foreign object damage and wear.

Although the present invention has been described with reference to preferred embodiments, workers skilled in the art will recognize that changes may be made in form and detail without departing from the spirit and scope of the invention.

What is claimed is:

1. An ice protection system for a gas turbine engine, the system comprising:
    a plurality of structural members arranged in a cascade configuration, each structural member defining a leading edge and opposite sidewalls, and wherein the plurality of structural members define a plurality of zones;
    at least one electrically-powered heater disposed at each of the plurality of structural members; and
    an ice protection system controller for controlling operation of the electrically powered heaters, wherein the ice protection system controller is configured to selectively provide power to the electrically-powered heaters by zone according to a duty cycle.

2. The system of claim 1, wherein a first of the plurality of structural members is symmetrically shaped and comprises:
    a first electrically-powered heater embedded at the leading edge of the structural member;
    a pair of second electrically-powered heaters embedded in the structural member opposite each other at locations along the sidewalls, wherein the pair of second electrically-powered heaters each have a Watt density less than a Watt density of the first electrically-powered heater; and
    a pair of third electrically-powered heaters embedded in the structural member opposite each other at locations along the sidewalls rearward of the pair of second electrically-powered heaters, respectively, wherein the pair of third electrically-powered heaters each has a Watt density less than the Watt densities of each of the second pair of electrically-powered heaters, wherein the Watt densities of the first electrically-powered heater and the second and third pairs of electrically-powered heaters are selected as a function of cooling coefficients for airflow passing the structural member during engine operation.

3. The system of claim 1, wherein the Watt density of the first electrically-powered heater is about three times more than the Watt densities of each of the pair of second electrically-powered heaters.

4. The system of claim 1, wherein the Watt densities of each of the pair of second electrically-powered heaters are about two times more than the Watt densities of each of the pair of third electrically-powered heaters.

* * * * *